US006761492B2

(12) United States Patent
Matsumoto

(10) Patent No.: US 6,761,492 B2
(45) Date of Patent: Jul. 13, 2004

(54) IMAGE FORMING DEVICE

(75) Inventor: Kazuhiko Matsumoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/397,346

(22) Filed: Mar. 27, 2003

(65) Prior Publication Data

US 2003/0185558 A1 Oct. 2, 2003

(30) Foreign Application Priority Data

Mar. 28, 2002 (JP) ....................................... 2002-092634

(51) Int. Cl.[7] ................................................ G03B 13/00
(52) U.S. Cl. ........................................ 396/571; 396/575
(58) Field of Search ................................ 396/571, 575, 396/578; 219/216; 355/27–30, 401, 405, 407

(56) References Cited

U.S. PATENT DOCUMENTS 5,068,681 A * 11/1991 Kosugi et al. .............. 396/572
5,414,488 A * 5/1995 Fujita et al. .................. 355/30
5,502,532 A * 3/1996 Biesinger et al. ........... 396/575
6,062,746 A 5/2000 Stoebe et al.
6,398,428 B1 6/2002 Szajewski et al.

FOREIGN PATENT DOCUMENTS

JP 2000-171914 6/2000
JP 2000221654 8/2000
JP 2001-356463 12/2001

* cited by examiner

*Primary Examiner*—D. Rutledge
(74) *Attorney, Agent, or Firm*—Sughrue Mion, PLLC

(57) ABSTRACT

An image forming device which automatically manages temperature and humidity for stably processing a photosensitive material. A temperature sensor and a humidity sensor sense changes in temperature and humidity within a heat developing section of the image forming device. A temperature regulator computes an optimal temperature and heating time in accordance with results of sensing, and controls a heating section and conveying of the photosensitive material.

20 Claims, 2 Drawing Sheets

IMAGE FORMING DEVICE

BACKGROUND OF THE INVENTION

1. Field of the Invention

The present invention relates to an image forming device, and in particular, to an image forming device which carries out heat-developing processing by conveying a photosensitive material to a heating section.

2. Description of the Related Art

Japanese Patent Application Laid-Open (JP-A) Nos. 2000-171914 and 2001-356463 and the like have proposed image forming devices which subject an exposed photosensitive material to heat-developing processing so as to form an image on the photosensitive material, and which read, by a scanner, the image formed on the photosensitive material.

In the heat-developing processing section of the above-described image forming device, the heating section is formed by a heat developing drum, a heating plate, or the like. A heater is housed in the heat developing drum or the heating plate, and the interior of the heating section is heated by the heater.

In accordance with such a structure, due to the photosensitive material, which is being conveyed within the heating section, being heated for a predetermined period of time (the time over which the photosensitive material passes through the heating section), i.e., due to the photosensitive material being subjected to heat-developing processing, the exposed image is formed on the photosensitive material Reproducibility of density and stability, i.e., the ability for the same image to always be formed at the same density on a photosensitive material, is required of the image forming device. The density of the image formed on the photosensitive material depends on the amount of heat in the heat-developing processing (i.e., the heating temperature and the heating time within the heating section). Accordingly, control of the heating temperature within the heating section is carried out at the image forming device.

Further, from the standpoint of the properties of the photosensitive material, the density of the image formed on the photosensitive material also depends on the environment (the temperature and humidity) in which the image forming device is placed. Namely, if the temperature or the humidity varies, even if the amount of heat in the heat-developing processing is kept at a predetermined temperature by the above-described control, fogging and changes in gradation will arise in the image formed on the photosensitive material.

Conventionally, in order to prevent fogging and changes in gradation caused by changes in temperature and humidity, heat-developing processing is carried out on a test photosensitive material at the time when the image forming device is started up. The results are photometrically measured, and after it is confirmed that there are no abnormalities in the temperature and humidity, heat-developing processing is carried out. This processing is called reference strip processing.

Specifically, in a state in which control of the temperature of the interior of the heating section is carried out, a test color photosensitive material, on which a reference pattern has been exposed in advance, is subjected to heat-developing processing and an image is formed. The test image formed on the test photosensitive material is photometrically measured by a calorimeter. The results of photometric measurement and the original test image are compared, and it is confirmed that no deviation in density has arisen.

Here, in cases in which the fogging and changes in gradation are greater than or equal to given values and are problematic, the environment in which the image forming device is disposed is adjusted, i.e., the air conditioning of the room in which the image forming device is placed is adjusted manually. Then, heat-developing processing of a test photosensitive material is carried out again, and after the fogging and changes in gradation are confirmed, heat-developing processing of an actual photosensitive material is carried out.

However, if the environment (the temperature and/or the humidity) of the image forming device changes after heat-developing processing of an actual photosensitive material has begun, the density of the formed image will deviate. Thus, large-scale air-conditioning equipment is needed in order to ensure that the environment does not change.

Further, depending on the history of the photosensitive material which is being processed, there are cases in which the moisture content of the photosensitive material varies. Because, in a short period of time, the moisture content of the photosensitive material does not coincide with the equilibrium moisture content of the environment in which processing is being carried out, there are cases in which the gradation and the fogging of the image greatly vary, which causes trouble in processing.

SUMMARY OF THE INVENTION

In view of the aforementioned, an object of the present invention is to provide an image forming device in which there is little fogging, excellent gradation reproducibility and excellent stability, by automatically correcting processing conditions in accordance with the environment in which the image forming device is placed, or in accordance with the history and the state of a photosensitive material.

A first aspect of the present invention is an image forming device subjecting a photographed photosensitive material, in which at least silver halide grains and a developing agent or a precursor of a developing agent are incorporated on a support, to heat-developing processing by conveying the photosensitive material through a heating section, so as to form an image on the photosensitive material, the image forming device comprising a temperature-sensing device, a device humidity-sensing device, a heating device, a first computing device, and a first controlling device. The device temperature is for sensing device sensing a temperature within the image forming device. The device humidity-sensing device is for sensing a humidity within the image forming device. The heating device is for heating an interior of the heating section. The conveying device is for conveying the photosensitive material within the heating section. The first computing device is for computing an optimal value of a heating temperature within the heating section and an optimal value of a heating time, on the basis of the temperature and the humidity sensed by the temperature-sensing device and the humidity-sensing device. The first control device is for controlling a heating temperature by the heating device and/or a photosensitive material conveying-speed by the conveying device, such that at least one of the optimal values is attained.

In accordance with the first aspect, the device temperature-sensing device senses the temperature within the device, and the device humidity-sensing device senses the humidity within the device. The temperature and humidity within the device affect the fogging and the gradation of the image formed on the photosensitive material.

Further, the fogging and the gradation of the image formed on the photosensitive material also depend on the heating temperature within the heating section and the heating time. Namely, the heating temperature within the heating section and the heating time are parameters of the fogging and the gradation of the image formed on the photosensitive material.

Here, the first computing device computes an optimal value of the heating temperature within the heating section and an optimal value of the heating time, on the basis of the sensed temperature and humidity. Then, the first control device controls the heating temperature by the heating device or the photosensitive material conveying-speed by the conveying device such that at least one of the optimal values is attained.

In this way, the optimal value of at least one of the heating temperature within the heating section and the heating time, which affect the fogging and the gradation of the image, offsets the "deviation" of the fogging and of the gradation which arise in the image formed on the photosensitive material in accordance with the change in the temperature and the humidity within the image forming device.

Accordingly, in accordance with the change in the temperature and the humidity within the image forming device, at least one of the heating temperature within the heating section and the heating time is adjusted. Therefore, the "deviation" of the fogging and of the gradation, which arise due to changes in the temperature and the humidity, can be corrected.

A second aspect of the present invention is an image forming device subjecting a photographed photosensitive material, in which at least silver halide grains and a developing agent or a precursor of a developing agent are incorporated on a support, to heat-developing processing by conveying the photosensitive material through a heating section, so as to form an image on the photosensitive material. The image forming device comprises a loading section, a temperature-sensing device, a moisture content sensing device, a heating device, a conveying device, a second computing device, and a second controlling device. The loading section is the section where the photosensitive material is loaded. The temperature-sensing device is for sensing a temperature of the photosensitive material loaded in the photosensitive material loading section. The moisture content sensing device is for sensing a moisture content of the photosensitive material loaded in the photosensitive material loading section. The heating device is for heating an interior of the heating section. The conveying device is for conveying the photosensitive material within the heating section. The second computing device is for computing an optimal value of a heating temperature within the heating section and an optimal value of a heating time, on the basis of the temperature and the moisture content sensed by the photosensitive material temperature-sensing device and the moisture content sensing device. The second control device is for controlling a heating temperature by the heating device and/or a photosensitive material conveying-speed by the conveying device, such that at least one of the optimal values is attained.

In accordance with the second aspect of the present invention, the photosensitive material temperature-sensing device senses the temperature of the photosensitive material loaded in the photosensitive material loading section, and the moisture content sensing device senses the moisture content of the photosensitive material loaded in the photosensitive material loading section. The temperature and the moisture content of the photosensitive material affect the fogging and the gradation of the image formed on the photosensitive material.

Further, the fogging and the gradation of the image formed on the photosensitive material also depend on the heating temperature within the heating section and the heating time. Namely, the heating temperature within the heating section and the heating time are parameters of the fogging and the gradation of the image formed on the photosensitive material.

Here, the second computing device computes an optimal value of the heating temperature within the heating section and an optimal value of the heating time, on the basis of the sensed temperature and moisture content of the photosensitive material. Then, the second control device controls the heating temperature by the heating device or the photosensitive material conveying-speed by the conveying device such that at least one of the optimal values is attained.

In this way, the optimal value of at least one of the heating temperature within the heating section and the heating time, which affect the fogging and the gradation of the image, offsets the "deviation" of the fogging and of the gradation which arise in the image formed on the photosensitive material in accordance with the change in the temperature and the moisture content of the photosensitive material.

Accordingly, in accordance with the change in the temperature and the moisture content of the photosensitive material, at least one of the heating temperature within the heating section and the heating time is adjusted. Therefore, the "deviation" of the fogging and of the gradation, which arise due to changes in the temperature and the moisture content of the photosensitive material, can be corrected.

More concretely, in the first aspect of the present invention, the optimal value of the heating temperature and the optimal value of the heating time are computed by the first computing device so as to offset the change in the density of the image formed on the photosensitive material due to the temperature or the humidity within the device.

Namely, the correlation between, on the one hand, the fogging and the change in gradation of the image formed on the photosensitive material, and, on the other hand, the temperature or the humidity within the device, can be measured and determined in advance. Therefore, the optimal value of the heating temperature and the optimal value of the heating time can be computed from this correlation.

Further, in the second aspect of the present invention, the optimal value of the heating temperature and the optimal value of the heating time are computed by the second computing device so as to offset the change in the density of the image formed on the photosensitive material due to the temperature or the moisture content of the photosensitive material.

Namely, the correlation between, on the one hand, the fogging and the change in gradation of the image formed on the photosensitive material, and, on the other hand, the temperature or the moisture content of the photosensitive material, can be measured and determined in advance. Therefore, the optimal value of the heating temperature and the optimal value of the heating time can be computed from this correlation.

The following are modes for implementing the present invention, but the present invention is not limited to these modes:

(1) A coupler, which reacts with an oxidant of a developing agent and forms a dye, may be incorporated on a support in the photosensitive material.

(2) The present invention may include a heating section temperature-sensing device which senses the temperature of the interior of the heating section, and on the basis of the temperature sensed by the heating section temperature-sensing device, the first control device and the second control device may control output of the heating device such that the heating temperature becomes an optimal value.

(3) Concurrently with above (2), a coupler, which reacts with an oxidant of a developing agent and forms a dye, may be incorporated on a support in the photosensitive material.

Further, in accordance with the second aspect of the present invention, the interior of the heating section is heated by the heating device, and the temperature is sensed by the heating section temperature-sensing device. On the basis of the temperature sensed by the heating section temperature-sensing device, the first control device and the second control device control the output of the heating device, and control the temperature such that the interior of the heating section becomes the optimal temperature.

Namely, the heating section temperature-sensing device is provided separately from the device temperature-sensing device and the photosensitive material temperature-sensing device. For example, when the temperature of the heating section decreases due to heat moving to the photosensitive material while the photosensitive material is undergoing heating processing, this decrease in temperature is sensed by the heating section temperature-sensing section. The first control device and the second control device receive this information, and effect control so as to increase the output in order to return the heating section to its original, optimal temperature.

DETAILED DESCRIPTION OF THE EMBODIMENTS

Figure 1:
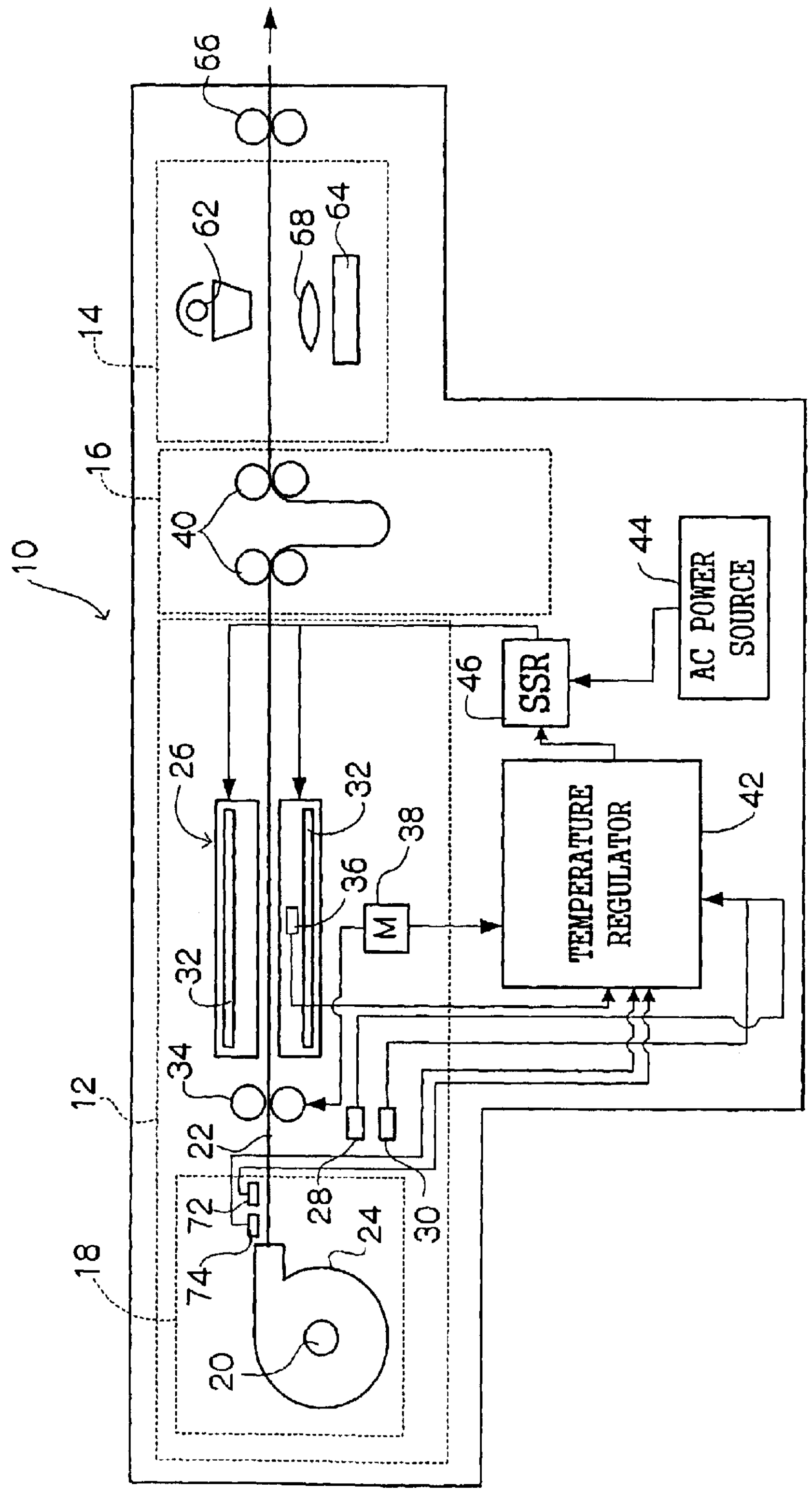
FIG. 1 is a structural diagram showing the structure of the interior of an image forming device of the embodiments of the present invention.

An image forming device 10 relating to a first embodiment is shown in FIG. 1. The image forming device 10 is formed from a heat developing device 12, an image reading device 14, and a face section 16 which connects the two.

A cartridge 24, which accommodates a photosensitive material 22 which has been photographed and which is taken-up on a take-up shaft 20, is loaded within a photosensitive material loading section 18 of the heat developing device 12. The photosensitive material 22 is pulled-out by unillustrated conveying rollers from the cartridge 24 loaded in the photosensitive material loading section 18, and is conveyed to a heating device 26 which will be described later.

The photosensitive material 22 is, for example, a color negative film. At least silver halide grains, a developing agent or precursor thereof, and a coupler which forms a dye upon reacting with the developing agent, are contained within the photosensitive material 22 on a base film. The photosensitive material 22 has the property that the sensitivity thereof changes in accordance with the temperature and the humidity.

A temperature sensor 28, which measures the temperature within the heat developing device 12, and a humidity sensor 30, which measures the relative humidity (which will simply be called "humidity" hereinafter), are mounted at the downstream side of the photosensitive material loading section 18. The temperature and the humidity within the heat developing device 12 are always monitored by the temperature sensor 28 and the humidity sensor 30. The sensed temperature and humidity are outputted to a temperature regulator 42.

The heating device 26 is disposed at the photosensitive material 22 conveying direction downstream side. Heaters 32 are accommodated so as to face one another within the housing of the heating device 26. Due to the photosensitive material 22 being conveyed between the heaters 32, the photosensitive material 22 is subjected to heat-developing processing such that an image is formed thereon. Further, a temperature sensor 36 is mounted to the interior of the heating device 26. The temperature sensed by the temperature sensor 36 is outputted to the temperature regulator 42.

Driving force from a driving motor 38, whose rotational speed is controlled, is transmitted to conveying rollers 34 which convey the printing plate 22 to the heating device 26, and the conveying rollers 34 nip and convey the photosensitive material 22 at an instructed speed.

The face section 16 is provided between the heat developing device 12 and the image reading device 14. A branched guide (not illustrated) operated by a solenoid is disposed in the face section 16. The branched guide can be switched between a horizontal state and a vertical state. When the branched guide is switched to the vertical state, the photosensitive material 22 goes slack between conveying rollers 40 and forms a loop.

In this way, the difference in the processing speed of the heat developing device 12 and the processing speed of the image reading device 14 is absorbed, and the image formed on the photosensitive material 22 can be read in a stable state.

The image reading device 14 measures the density of the image formed on the photosensitive material 22 and outputs image data. The photosensitive material 22, whose image data has been read by the image reading device 14, is discharged to the exterior of the image forming device 10. Note that, instead of the temperature sensor 28 and the humidity sensor 30, a temperature sensor and a humidity sensor may be provided within the photosensitive material loading section 18.

Next, the heating device 26 will be described concretely.

As shown in FIG. 1, the temperature sensor 36 which measures temperature is mounted to the transverse direction center of the interior of the heating device 26. The type of the temperature sensor 36 is not particularly limited provided that the temperature sensor 36 can measure the temperature, and the temperature sensor 36 may be a thermocouple or a thermistor or the like. The temperature sensor may be two or more temperature sensors, and they may be different types, or a plurality of the same type of temperature sensors may be used to control a plurality of heaters.

The heaters 32 provided at the interior of the heating device 26 are connected to an AC power source 44 which supplies AC voltage of 200 V. Namely, due to electric power being supplied to the heaters 32 from the AC power source 44, the heaters 32 heat the photosensitive material 22. An SSR (solid-state relay) 46 is provided between the heaters 32 and the AC power source 44. The SSR 46 also is connected to the temperature regulator 42.

Only when a predetermined signal is inputted from the temperature regulator 42 to the SSR 46 is the SSR 46 in a continuous state and supplies electric power to the heaters 32. Namely, due to the temperature regulator 42 switching the SSR 46 between a continuous state and a non-continuous state, the heaters 32 can be switched on and off. Further, the electric power supplied to the heaters 32 also can be varied by carrying out this switching between the continuous state and the non-continuous state in an extremely short period of time (the level of a cycle of the AC power source). In this way, the heating temperature of the heating device 26 is controlled.

Next, the temperature regulator 42 will be described.

Figure 2:
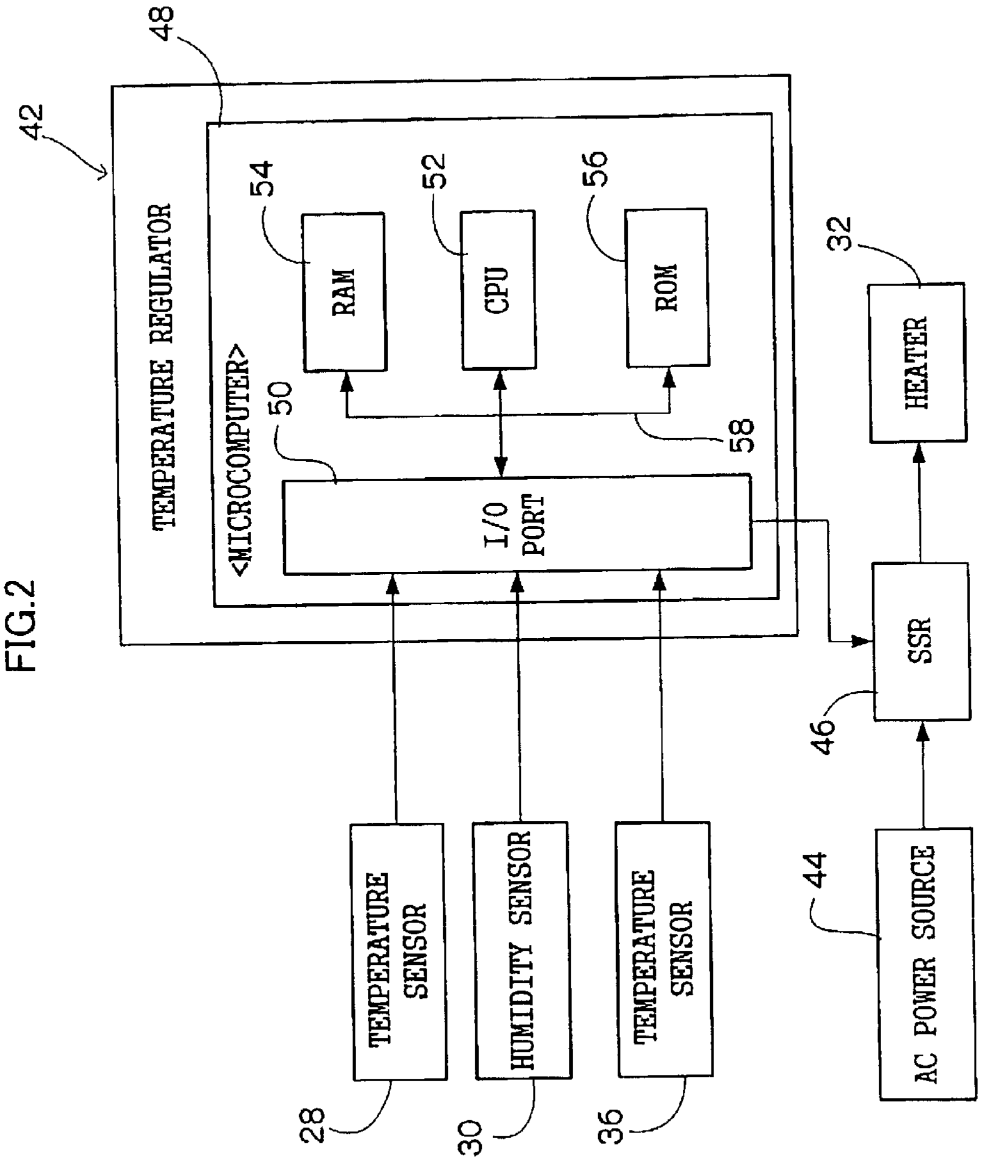
FIG. 2 is a block diagram of a temperature regulator in the embodiments.

As shown in FIG. 2, a microcomputer 48 is built-in in the temperature regulator 42. The microcomputer 48 has an I/O port 50, a CPU 52, a RAM 54, and a ROM 56, which are connected by a bus 58.

The temperature sensor 28, the humidity sensor 30, and the temperature sensor 36 are connected to the input side of the I/O port 50. In this way, the temperature of the interior of the heating device 26 which is measured by the temperature sensor 36, and the temperature and humidity of the interior of the heat developing device 12 which are measured by the temperature sensor 28 and the humidity sensor 30, are inputted to the temperature regulator 42, and are stored at all times in the RAM 54. Further, the SSR 46 is connected to the output side of the I/O port 50.

Further, a correlation function between the environment (temperature and humidity) in which the photosensitive material 22 is disposed or the temperature or the moisture content of the photosensitive material itself, and the heating temperature and the heating time of the heating device 26 for reproducing density correctly (hereinafter called "optimal temperature, optimal time") is stored in the ROM 56.

The correlation function is computed by measuring and determining in advance the relationship between the temperature and humidity or the temperature and moisture content of the photosensitive material and the fogging and gradation of the image formed by the heat-developing processing, and the relationship between the heating temperature or the heating time of the heating device 26 and the fogging and gradation of the image formed by heat-developing processing.

For example, an experiment is carried out in order to confirm the relationship between the temperature and the humidity, and the fogging and gradation by leaving a photosensitive material, which has been exposed under given conditions, in the environment (temperature and humidity) in which the image forming device is placed until the photosensitive material reaches an equilibrium state, and thereafter, subjecting the photosensitive material to heat-developing processing at a given heating amount. On the basis of the results of this experiment, the relationship as to how the image density of the photosensitive material exposed under the given conditions varies in accordance with changes in temperature and humidity can be determined.

The image density varies also in accordance with the heating amount (heating temperature multiplied by heating time). Thus, if the heating amount is varied in the direction of offsetting the change in the temperature and humidity, a uniform image density can be obtained from a photosensitive material exposed under given conditions, independent of changes in humidity and temperature.

Note that fogging is a term which expresses the density of unexposed portions of the photosensitive material, and gradation is a term which expresses the amount of change in image density corresponding to the exposure amount. Image density is a collective term for the amount of change in image density corresponding to the density of the unexposed portions and the exposure amount.

In the present embodiment, it is the heating amount which is ultimately controlled, and concretely, the image density is controlled by the heating temperature or the heating time. Theoretically, control can be carried out by the heating amount. However, because there are also the effects of the characteristics of the photosensitive material or the heating device (e.g., the diffusion speed of the heat, and the temperature distribution within the heating device), there are cases in which, even if control is carried out by the heating amount, the same effects are not obtained. Thus, here, in the present embodiment, in order to always obtain constant results, the heating temperature and the heating time are controlled individually.

Here, in order to concretely explain the aforementioned correlation function, the relationship, which is determined in advance by measurement, between temperature and humidity and the density of the image formed by heat-developing processing, will be described. The density of the formed image can be plotted on the vertical axis, and the temperature and humidity on the horizontal axis.

Usually, the higher the temperature, the easier it is for high humidity to arise, and the lower the temperature, the easier it is for low humidity to arise. Here, LL (low temperature and humidity) denotes 15° C. and 30% RH (relative humidity), and MM (standard temperature and humidity) denotes 25° C. and 50% RH, and HH (high temperature and humidity) denotes 30° C. and 80% RH.

In the heat developable photosensitive material used in the present invention, generally, the lower the humidity and temperature, the lower the density of the formed image, and the higher the humidity and temperature, the greater the density of the formed image. Namely, the photosensitive material 22 generally has the property that, the lower the temperature and humidity, the lower the fogging and sensitivity of the photosensitive material 22, and the higher the temperature and humidity, the higher the fogging and sensitivity of the photosensitive material 22.

With the heat developable photosensitive material used in the present invention, generally, the higher the heating temperature of the heating device 26, the more that highly-fogged images are formed, and the higher the heating temperature of the heating device 26, the more that images having high gradation are formed.

Accordingly, in the correlation function determined from the relationship between humidity and temperature and density and from the relationship between the heating temperature of the heating device 26 and density, an optimal temperature which is a higher heating temperature the lower the temperature and humidity are, is computed. Further, an optimal temperature, which is a lower heating temperature the higher the temperature and humidity are, is computed.

Five control functions A, B, C, D, E for controlling the temperature of the heating device 26 by a PID method are stored in the ROM 56. The control functions A, B, C, D, E are control functions corresponding to temperature change patterns of the heating device 26 at the time of start-up of the heat developing device 12, at the time of standby, at the time of the start of heat-developing processing, at the time of recovering from a decrease in temperature due to heat-developing processing, and at the time of preventing overshooting, respectively. Temperature change patterns corresponding to the control functions A, B, C, D, E are also stored in the ROM 56.

In accordance with the correlation function stored in the ROM 56, the CPU 52 determines an optimal temperature of the heating device 26 which is at the temperature and humidity measured by the temperature sensor 28 and the humidity sensor 30.

Further, the CPU 52 computes the change in the temperature of the heating device 26 from the temperature of the heating device 26 measured by the temperature sensor 36. The CPU 52 judges which temperature change pattern among the temperature change patterns of the time of start-up of the heat developing device (A), the time of standby (B), the time of the start of heat-developing processing (C), the time of recovering from a decrease in temperature due to heat-developing processing (D), and the time of preventing overshooting (E), the temperature change corresponds to, and selects the control function corresponding thereto from among the control functions A, B, C, D, E. Then, in accordance with this control function, the CPU 52 outputs a signal to the SSR 46.

For example, in the temperature change pattern at the time when the photosensitive material passes through the heating device and the temperature of the heating device drops due to the diffusion of heat to the photosensitive material, control function D is selected, and the temperature of the heating device is maintained constant.

Note that, when heat-developing processing is carried out continuously after standby, a predetermined selection order for selecting the control function may be determined in advance (e.g., A→B→C→D→E→B→C→D→E . . . ), and the control function can be selected in accordance with this selection order.

Next, the flow of image forming processing of the present embodiment will be described.

The photosensitive material 22 is pulled-out from the cartridge 24 loaded in the photosensitive material loading section 18, and is fed by the conveying rollers 34 to the heating device 26. The heating device 26 is at a temperature which is appropriate for heat-developing processing. The photosensitive material 22, which is conveyed through the interior of the heating device 26, is heated for a predetermined time (is conveyed at a predetermined conveying speed), and undergoes heat developing.

The photosensitive material 22, on which an image has been formed, is fed to the image reading device 14 via the face section 16. At the face section 16, when the leading end portion of the photosensitive material 22 is nipped by the right side conveying rollers 40, the branched guide is set in a vertical state by the solenoid. After a loop has formed between the left and right conveying rollers 40, the photosensitive material 22 is fed to the image reading device 14.

Here, in the image reading device 14, light is irradiated to the photosensitive material 22 from a light source 62, and the transmitted light is focused by a lens 68 onto a CCD 64. The image density is converted into electronic data by the CCD 64, and is outputted as electronic image data. The photosensitive material 22 whose image data has been read is discharged to the exterior by discharging rollers 66.

Next, the flow of control in the heating device will be described.

When the power of the image forming device 10 is turned on, the power of the heat developing device 12 is turned on. Measurement of the temperature and the humidity of the interior of the heat developing device 12 is started by the temperature sensor 28 and the humidity sensor 30.

The temperature regulator 42 receives this temperature and humidity information, and, from the correlation function of the density and the optimal temperature stored in the ROM 56, determines the optimal temperature of the heating device 26 which is at that temperature and humidity. The measurement of the temperature and the humidity by the temperature sensor 28 and the humidity sensor 30 is always carried out while the image forming device 14 is on.

The measurement of the temperature of the interior of the heating device 26 is begun by the temperature sensor 36. The temperature regulator 42 receives this temperature information, and judges that it is the time of start-up of the heating device 26. Using the control function A for the time of start-up, the temperature regulator 42 controls the output of the heaters 32 by the SSR 46 such that the heaters 32 quickly heat to the optimal temperature. Note that the conveying speed of the photosensitive material 22 is constant.

When, based on the results of measurement of the temperature sensor 36, it is judged that the heating device 26 has reached the optimal temperature, output of the heaters 32 is controlled by the SSR 46 by utilizing the control function B for the time when the heating device 26 is in a standby state.

Due to the control using the control function B, the temperature of the heating device 26 is held at the optimal temperature, and image forming processing by the image forming device 14 is possible.

When the image forming processing is started and heat-developing processing is carried out, the photosensitive material 22, which is a lower temperature than the optimal temperature, contacts the heating device 26. The temperature of the heating device 26 is thereby lowered.

When this decrease in temperature is detected by measurement of the temperature of the heating device 26 by the temperature sensor 36, the temperature regulator 42 judges that the heat-developing processing has started. Accompanying this judgement, at the temperature regulator 42, the control function which restricts the output of the heaters 32 is switched to the control function C for the time of starting heat-developing processing. By control using control function C, control can be carried out such that a decrease in the temperature of the heating device 26 can be prevented.

Thereafter, control using the control function C begins, and the temperature of the heating device 26 begins to rise. When this change in temperature is detected by the measurement of the temperature of the heating device 26 by the temperature sensor 36, the temperature regulator 42 judges that recovery from the decrease in temperature caused by the heat-developing processing has started. Accompanying this judgement, the temperature regulator 42 switches the control function controlling the output of the heaters 32 to control function D for the time of recovery from the decrease in temperature due to heat-developing processing. By control using the control function D, the temperature of the heating device 26 is controlled so as to return to the optimal temperature.

When the temperature of the heating device 26 reaches the optimal temperature or more and this rise in temperature is sensed by the measurement of the temperature of the heating device 26 by the temperature sensor 36, the temperature regulator 42 judges that the optimal temperature is being overshot. Accompanying this judgement, the temperature regulator 42 switches the control function controlling the output of the heaters 32 to control function E for the time of overshooting. By control using the control function E, the temperature of the heating device 26 is controlled to fall to the optimal temperature.

When the temperature of the heating device 26 falls to the optimal temperature, the heating device 26 is once again set in a standby state. Control is switched to control in accordance with control function B for the time of standby. The control repeats in the same way as described above.

However, while the image forming device 14 is working, there are cases in which the environment at the interior of the heat developing device 12, i.e., the temperature and the humidity, changes. The sensitivity of the photosensitive material 22 varies in accordance with the temperature and the humidity, and the density of the formed image changes. Thus, when a change in temperature and humidity is sensed by the temperature sensor 28 and the humidity sensor 30, the temperature regulator 42 re-computes the optimal temperature of the heating device 26 from the correlation function of the density and the optimal temperature of the heating device 26. Temperature control thereafter is carried out by using this newly computed optimal temperature. Namely, by changing the optimal temperature of the heating device 26, on which the image density depends, in accordance with changes in the temperature and humidity, fogging and changes in gradation can be prevented.

For example, if the temperature and humidity within the heat developing device 12 fall and the temperature sensor 28 and the humidity sensor 30 detect this decrease in temperature and humidity, the temperature regulator 42 re-computes the optimal temperature to be a higher optimal temperature. In the present embodiment, an environment of ordinary temperature and ordinary humidity (MM) is the default value. A decrease in temperature and humidity means that the temperature and humidity are lower than MM, and an increase in temperature and humidity means that the temperature and humidity are higher than MM.

Accordingly, when the temperature and the humidity within the heat developing device 12 which is working decrease, the temperature regulator 42 switches the control function which is controlling the output of the heaters 32 to control function A for the time of start-up. Note that, in a case in which heat-developing processing is being carried out, the switching of the control function is postponed to wait until that heat-developing processing has been completed, and is then carried out thereafter. By control using control function A, the optimal temperature of the heating device 26 is newly computed, and heating is carried out until this optimal temperature is attained. When the heating device 26 reaches this newly computed optimal temperature, the heating device 12 is set in a standby state.

When the temperature and humidity within the heating developing device 12 which is working rise and the temperature sensor 28 and the humidity sensor 30 sense this rise in the temperature and humidity, the temperature regulator 42 re-computes the optimal temperature to be a lower optimal temperature. Further, the temperature regulator 42 switches the control function, which controls the output of the heaters 32, to control function E for the time of overshooting. Note that, in a case in which heat-developing processing is being carried out, the switching of the control function is postponed to wait until that heat-developing processing has been completed, and is then carried out thereafter. By control using control function E, the optimal temperature of the heating device 26 is newly computed, and control is carried out so that this optimal temperature is attained. When the temperature of the heating device 26 decreases to this newly computed optimal temperature, the heat developing device 12 is set in a standby state.

As described above, in the present embodiment, the temperature of the heating device 26 is adjusted in accordance with changes in the temperature and humidity. Therefore, fogging and changes in gradation of formed images can be prevented.

In the present embodiment, by adjusting the optimal temperature of the heating device 26, fogging and changes in gradation of an image, which are caused by changes in the temperature and humidity, are eliminated. However, the present invention is not limited to the same. Because the density of the image also depends on the heating time, the conveying speed may be adjusted in accordance with changes in the temperature and humidity.

Specifically, the relationship between the heating time and image fogging, and the relationship between the heating time and gradation changes, are determined. From these relationships, and from the relationship between density and the temperature and humidity, the correlation between the heating time and the temperature and humidity is determined. An optimal time, which corresponds to the temperature and humidity measured by the temperature sensor 28 and the humidity sensor 30, is computed from this correlation. The conveying speed of the photosensitive material 22 is computed from this optimal time and the length of the conveying path of the heating device 26.

Then, the temperature regulator 42 controls the rotational speed of the driving motor 38 such that the photosensitive material 22, which is being nipped and conveyed by the conveying rollers 34, is fed to the heating device 26 at the computed conveying speed.

Further, fogging and gradation changes of an image, which are caused by changes in the temperature and the moisture content of the photosensitive material itself, can be eliminated by adjusting the optimal temperature of the heating device 26.

Specifically, the relationship between the temperature of the photosensitive material and image fogging, and the relationship between the temperature of the photosensitive material and gradation changes, and the relationship between the moisture content of the photosensitive material and image fogging, and the relationship between the moisture content of the photosensitive material and gradation changes are determined. From these relationships, and from the relationship between the heating temperature on the one hand and fogging and gradation changes on the other, and the relationship between the heating time on the one hand and the fogging and gradation changes on the other, the correlation between the temperature of the photosensitive material and the heating time or the heating temperature, or the correlation between the moisture content of the photosensitive material and the heating time or the heating temperature, is determined.

The temperature or the moisture content of the photosensitive material 22, which is pulled out from the cartridge 24, is measured at a temperature sensor 72 or a moisture content sensor 74 provided at the photosensitive material loading section 18, and, from this correlation, control is carried out so as to compute the optimal temperature of the heating temperature or the optimal time of the heating time corresponding thereto. Image fogging and gradation changes, which are caused by changes in the temperature or the moisture content of the photosensitive material, can thereby be eliminated.

A commercially-available near infrared ray moisture content meter, electrostatic capacity meter, or the like can be used as the moisture content sensor 74. Further, the moisture content in the photosensitive material can be estimated by using a surface resistance meter.

Moreover, in the present embodiment, control of the temperature of the heating device 26 is carried out by using the five control functions A, B, C, D, E and by switching between these five control functions A, B, C, D, E in accordance with the temperature change pattern of the heating device 26. However, the present invention is not limited to the same. For example, in a case in which a heater formed of a material having a high heat capacity is used, a fewer number of control functions may be used.

Further, two heaters 32 which heat the heating device 26 are provided. However, the present invention is not limited to the same, and a plurality of heaters maybe used. For example, in order to extend the life of the heaters, a plurality of heaters which heat the heating device 26 maybe provided, and the outputs thereof may be collectively controlled as described above.

In addition, control of the electric power supplied to the heaters 32 is carried out by using the temperature regulator 42 and the SSR 46. However, control of the electric power is not limited to the same, provided that the electric power which is supplied from the AC power source 44 to the heaters 32 is controlled in accordance with the temperature of the heating device 26. For example, the electric power supplied to the heaters 32 from the AC power source 44 may be controlled by using a TRIAC circuit in place of the SSR 46.

Next, the photosensitive material used in the present invention will be described.

In the present invention, known heat developing color photosensitive materials may be used. Specifically, the heat developable photosensitive materials disclosed in the following publications are often used: U.S. Pat. No. 5,698,365; European Patent No. 1,113,316; JP-A Nos. 2001-92091, 2001-201828, 2001-290247, 2001-350236, 2001-350240; and Japanese Patent Application Nos. 2000-365909, 2001-218229, 2001-218871, 2001-352413; and the like.

The silver halide grains used in the photosensitive material of the present invention may be any of silver iodobromide, silver bromide, silver chlorobromide, silver iodochloride, silver chloride, and silver iodochlorobromide. The size of the silver halide grains is, when converted to diameters of spheres of the same volume, 0.1 to 2 $\mu$m, and 0.2 to 1.5 $\mu$m is often used.

The shapes of the silver halide grains are not limited. However, it may be practical to use tabular grains whose aspect ratio, which is a value equal to the grain projected diameter divided by the grain thickness, is 2 or more and often 8 or more, and to use an emulsion which accounts for 50% or more, and often 80% or more, and more often 90% or more of the projected surface area of the entire grain.

The thickness of the tabular grains is often 0.3 $\mu$m or less, more often 0.2 $\mu$m or less, and sometimes 0.1 $\mu$m or less. Grains whose grain thickness is thinner than 0.07 $\mu$m and whose aspect ratio is high can also be often used. Further, high silver chloride tabular grains having a (111) plane as the major face, and high silver chloride tabular grains having a (100) plane as the major face can also be often used.

The silver halide grains of the present invention are often monodisperse grains whose grain size distribution is uniform. The monodisperse quality, as expressed by a coefficient of change which is the standard deviation of the grain diameter distribution divided by the average grain diameter, is often 25% or less and more often 20% or less. Further, it may be practical that the halogen composition is uniform among the grains.

The silver halide grains of the present invention may uniformly form a halogen composition within the grains, or may intentionally introduce a different region of the halogen composition. Grains having a laminated structure formed from a core and a shell of different halogen compositions are often used. Further, it may be practical to, after introducing a different region of a halogen composition, further grow the grains, and intentionally introduce a dislocation line. Moreover, it may be practical to epitaxially bond guest crystals of a different halogen composition to the peaks or edges of the formed host grains.

In the silver halide grains of the present invention, it may be practical that the grain interior be doped with multivalent transition metal ions or multivalent anions as an impurity. In the case of the former in particular, a halogeno complex having an iron family element as the central metal, or a cyano complex, an organic ligand complex or the like is often used.

The method of preparing the silver halide grains of the present invention can basically be carried out by using a known method such as P. Glafkides, "Chimie et Phisique Photographique", Paul Montel, 1967; G. F. Duffin, "Photographic Emulsion Chemistry", Focal Press, 1966; V. L. Zelikman et al., "Making and Coating of Photographic Emulsion", Focal Press, 1964; or the like. A controlled double jet method, which controls the addition of the reaction liquid so as to maintain the pAg during the reaction at a target value, may also often be used. Further, a method for keeping the pH value during the reaction constant can be used. Moreover, a method can be used in which, at the time of forming the grains, the temperature of the system and the pH or the pAg value are varied so as to control the solubility of the silver halide. Thioether, thiourea, rhodanate or the like can be used as the solvent.

After forming the silver halide grains, it may be practical to remove the excess water-soluble salts.

The emulsion of the present invention is often subjected to usual chemical sensitizing and spectral sensitizing.

For chemical sensitizing, a chalcogen sensitizing method using sulfur, selenium or a tellurium compound, or a precious metal sensitizing method using gold, platinum, indium or the like, or a reduction sensitizing method using a compound having appropriate reducibility in the formation of the grains, can be used singly or in combinations thereof.

For spectral sensitizing, a spectral sensitizing dye which is adsorbed to the silver halide grains and imparts sensitivity of its own absorption wavelength range, such as cyanine dyes, merocyanine dyes, complex cyanine dyes, complex merocyanine dyes, holopolar dyes, hemicyanine dyes, styryl dyes, hemioxonol dyes or the like may be used. A single one of these dyes may be used, or two or more may be used in combination. It may be practical to use such a spectral sensitizing dye together with a supersensitizer.

The photosensitive silver halide is used in an amount, as calculated in terms of silver, of 0.05 to 15 $g/m^2$, and often 0.1 to 8 $g/m^2$.

It may be practical to add various stabilizers to the silver halide emulsion of the present invention in order to prevent fogging and to improve the stability during storage. In particular, triazoles or mercaptoazoles, which have, as a substituent, an aromatic ring or an alkyl group of five or more carbon atoms in the compound, prevent fogging at the time of heat development, and in certain cases, result in the marked effects of improving the developability of the exposure section and imparting high discrimination. Additives for photography, which are for silver halide emulsions, which are disclosed in Research Disclosure No. 17643 (December 1978), No. 18716 (November 1979), No. 307105 (November 1989), and No. 38957 (September 1996), can often be used.

The addition of such fogging preventing agents or stabilizers to the silver halide emulsion can be carried out at any time during the preparation of the emulsion. Any of the following various times for addition can be used singly or in combination: after chemical sensitizing has been completed and while the application liquid is being prepared, after chemical sensitizing has been completed, while chemical sensitizing is being carried out, before chemical sensitizing, after formation of the grains has been completed and before desalinating, while the grains are being formed, or before the grains are formed.

The amount of the fogging preventing agent or stabilizer which is added varies greatly in accordance with the purpose and the halogen composition of the silver halide emulsion. However, generally, the range is $10^{-6}$ to $10^{-1}$ mol, and often $10^{-5}$ to $10^{-2}$ mol, per 1 mol of silver halide.

Additives for photography which are used in the above-described photosensitive material of the present invention are disclosed in Research Disclosure (hereinafter abbreviated as "RD") No. 17643 (December 1978), No. 18716 (November 1979), and No. 307105 (November 1989). Where the disclosures can be found in these publications are summarized in the following table.

| type of additive | RD 17643 | RD 18716 | RD 307105 |
|---|---|---|---|
| chemical sensitizer | page 23 | page 648, right column | page 866 |
| sensitivity increasing agent | | page 648, right column | |
| spectral sensitizer, supersensitizer | pages 23–24 | page 648, right column to page 649, right column | pages 866–868 |
| brightener | page 24 | page 648, right column | page 868 |
| antifogging agent, stabilizer | pages 24–26 | page 649, right column | pages 868–870 |
| light absorbent, filter dye, UV absorbent | pages 25–26 | page 649, right column to page 650, left column | page 873 |
| dye image stabilizer | page 25 | page 650, left column | page 872 |
| film hardening agent | page 26 | page 651, left column | pages 874–875 |
| binder | page 26 | page 651, left column | pages 873–874 |
| plasticizer, lubricant | page 27 | page 650, right column | page 876 |
| coating aid, surfactant | pages 26–27 | page 650, right column | pages 875–876 |
| antistatic agent | page 27 | page 650, right column | pages 876–877 |
| matting agent | | | pages 878–879 |

(Organic Silver)

In the present invention, a non-photosensitive, reducible silver salt may be used. Complexes of organic or inorganic silver salts, which have a complex stability constant, which is the gross stability constant with respect to the silver ions of the ligand, of from 4.0 to 10.0, are often used as the silver salt.

Suitable organic silver salts encompass silver salts of organic compounds having a carboxyl group.

Also often used are silver salts of mercapto- or thion-substituted compounds having a hetero ring nucleus including carbon, and at least one nitrogen atom, and up to two different types of atoms selected from oxygen, sulfur and nitrogen. Representative examples of often-used hetero ring nuclei include triazole, oxazole, thiazole, thiazoline, imidazoline, imidazole, diazole, pyridine, and triazine. Preferable examples of such heterocyclic ring compounds are silver salt of 3-mercapto-4-phenyl-1,2,4-triazole, silver salt of 2-mercaptobenzimidazole, silver salt of 2-mercapto-5-aminothiadiazole, silver salt of 2-(2-ethyl-glycolamide) benzothiazole, silver salt of 5-carboxyl-1-methyl-2-phenyl-4-thiopyridine, silver salt of mercaptotriazine, silver salt of 2-mercaptobenzoxazole, silver salt of 1-mercapto-5 alkyl-substituted tetrazole, silver salt of 1-mercapto-5 phenyltetrazole disclosed in JP-A No. 1-100177, silver salts of 1,2,4-mercaptothiazole derivatives such as silver salt of 3-amino-5-benzylthio-1,2,4-triazole, silver salts of thion compounds such as 3-(2-carboxylethyl)-4-methyl-4-thiazoline-2-thion, silver salt of benzothiazole and derivatives thereof, silver salt of methylbenzotriazole, silver salts of substituted benzotriazoles such as silver salt of 5-chlorobenzotriazole, silver salt of 1,2,4-triazole, silver salt of 1H-tetrazole disclosed in U.S. Pat. No. 4,220,709, silver salts of imidazole and imidazole derivatives, and the like.

In addition, examples of effective mercapto- or thion-substituted compounds which do not contain a hetero ring nucleus are silver salts of thioglycolic acid such as silver salt of S-alkylthioglycolic acid (the alkyl group contains 12 to 22 carbon atoms), silver salts of dithiocarboxylic acid such as silver salt of diol acetate, and silver salt of thioamide. Further, the silver acetylene disclosed in U.S. Pat. No. 4,775,613 is also effective.

Two or more types of organic silver salts may be used. The above-listed organic silver salts can be used in an amount of 0.01 to 10 mol, and often 0.01 to 1 mol with respect to 1 mol of the photosensitive silver halide. The total applied amount of the photosensitive silver halide emulsion and the organic silver salt is, as calculated in terms of silver, 0.05 to 10 $g/m^2$, and often 0.1 to 4 $g/m^2$.

The total applied amount of the photosensitive silver halide emulsion and the organic silver salt is, as calculated in terms of silver, 0.1 to 20 $g/m^2$, and often 1 to 10 $g/m^2$. The organic silver salt often forms about 5 to 70% by mass of the image forming layer.

The organic silver often used in the present invention is prepared by reacting silver nitrate with the above-described organic compound in a sealing means for mixing a liquid, or an alkali metal salt (such as Na salt, K salt, or Li salt) solvent or suspension. The method of forming the silver salt of the organic compound which is often used in the present invention is the method disclosed in JP-A No. 1-100177 of preparing the silver salt while controlling the pH. The organic silver salt used in the present invention is often desalinated. The method of desalination is not particularly limited, and a known method can be used. However, known filtering methods such as centrifugal filtering, suction filtering, ultrafiltering, flocculation rinsing by coagulation, or the like can often be used.

The shape and the size of the organic silver salt which can be used in the present invention are not particularly limited. However, a solid particulate dispersion whose average grain size is 0.001 $\mu m$ to 5.0 $\mu m$ may often be chosen. An often-used average grain size is 0.005 $\mu m$ to 1.0 $\mu m$. The grain size dispersion of the organic silver salt solid particulate dispersion used in the present invention is often monodisperse. Concretely, the percentage (coefficient of change) of the value of the standard deviation of the volume load average diameter divided by the volume load average diameter is 80% or less, and often 50% or less.

Known developing agents and developing agent precursors are used in the photosensitive material used in the present invention. The developing agents and precursors disclosed in the following publications can be often used: U.S. Pat. No. 5,698,365; European Patent No. 1,113,316; JP-A Nos. 2001-92091, 2001-201828, 2001-290247, 2001-350236, 2001-350240; and Japanese Patent Application No. 2000-365909. In addition, the blocking chemicals disclosed in the following publications also can be often used: European Patent Nos. 1,164,417,1,164,418, 1,160,621; U.S. Pat. No. 6,319,640; European Patent Nos. 1,158,359, 1,113,322 through 1,113,326; Japanese Patent Application Nos. 2000-237692, 2001-352413, 2001-218229; and the like.

The couplers used in the photosensitive material used in the present invention are compounds called known couplers in the photographic industry. 2-equivalent or 4-equivalent couplers are used. Examples of couplers for photography are the couplers having the functions explained in Nobuo Furutachi, "Konbenshonaru Kara Shashinyo Yuki Kagobutsu" ("Organic Compounds for Conventional Color Photography") in "Yuki Gosei Kagaku Kyokai-shi" ("The Journal of The Society of Synthetic Organic Chemistry, Japan")), No. 41, p. 439, 1983, and the couplers disclosed in detail in Research Disclosure No. 37038 (February 1995), pages 80–85 and pages 87–89.

Further, hydrophobic additives, such as these couplers and color developing agents and the like, can be introduced into the layers of the photosensitive material by known methods such as the method disclosed in U.S. Pat. No. 2,322,027 or the like. In this case, a high boiling point organic solvent such as disclosed in U.S. Pat. No. 4,555,470 or Japanese Patent Application Publication (JP-B) No. 3-62256 or the like can, if needed, be used in combination with a low boiling point organic solvent having a boiling point of 50° C. to 160° C. Further, two or more types of these dye donating couplers and high boiling point organic solvents and the like can be used in combination.

The hydrophobic additives can be made into particulates and dispersed and contained in a binder by the dispersing method by a polymeric product disclosed in JP-B No. 51-39853 and JP-A No. 51-59943, or by a method other than those described above in the case of a compound which is substantially insoluble in water. Various surfactants can be used at the time of dispersing a hydrophobic compound in a hydrophilic colloid. For example, the surfactants disclosed on pages (37)–(38) of JP-A No. 59-157636 and in the aforementioned Research Disclosures can be used. Further, the phosphoric ester surfactants disclosed in JP-A Nos. 7-56267 and 7-228589 and in West German Laid-Open Patent No. 1,932,299A can also be used.

A powder of the coupler compound can be used in a state of being dispersed in water in accordance with a well-known solid dispersing method, by a media dispersing device such as a ball mill, a colloid mill, a sand grinder mill or the like, or by a homogenizer such as a Manton-Gaulin, a microfluidizer, an ultrasonic homogenizer, or the like.

The coupler compound used in the present invention may be added to any layer on the substrate provided that it is in the same surface as the photosensitive silver halide and the reducible silver salt. However, it may be practical to add the coupler compound to the layer which contains the silver halide or the layer adjacent thereto.

The added amount of the coupler compound used in the present invention is, with respect to 1 mol of silver, often 0.2 to 200 millimol, and more often 0.3 to 100 millimol, and even sometimes 0.5 to 30 millimol. One type of coupler compound may be used or two or more types may be used in combination.

A functional coupler such as those described hereinafter may be used in the present invention.

Examples of couplers in which the color forming dye has appropriate diffusivity and couplers for correcting unneeded absorption of the color forming dye are the colorless masking couplers expressed by formula (A) in claim 1 of WO 92/11575; compounds (including couplers) which react with developing agent oxidants and release compound residual groups which are photographically effective; development suppressing agent releasing compounds: the compounds expressed by formulas (I) through (IV) on page 11 of EP 378,236A1, and the compounds expressed by formula (I) on page 7 of EP 436,938A2, and the compounds expressed by formula (1) of EP 568,037A, and the compounds expressed by formulas (I), (II), (III) of pages 5–6 of EP 440,195A2; bleaching promoting agent releasing compounds: the compounds expressed by formula (I) on page 5 of EP 310,125A, and the compounds expressed by formula (I) of claim 1 of JP-A No. 6-59411; ligand releasing compounds: the compounds expressed by LIG-X in claim 1 of U.S. Pat. No. 4,555,478; leuco dye releasing compounds: compounds 1–6 of columns 3–8 of U.S. Pat. No. 4,749,641; fluorescent dye releasing compounds: the compound expressed as COUP-DYE in claim 1 of U.S. Pat. No. 4,774,181; development promoting agent or fogging agent releasing compounds: the compounds expressed by formulas (1), (2), and (3) of column 3 of U.S. Pat. No. 4,656,123, and EXZK-2 of EP 450,637A2, page 75, lines 36–38; compounds which, when separating, first release a group which becomes a dye: the compounds expressed by formula (I) of claim 1 of U.S. Pat. No. 4,857,447, and the compounds expressed by formula (1) of JP-A No. 5-307248, and the compounds expressed by formulas (I), (II), and (III) of pages 5 and 6 of EP 440, 195A2, and the compounds—ligand releasing compounds expressed by formula (I) of claim 1 of JP-A No. 6-59411, and the compounds expressed by LIG-X of claim 1 of U.S. Pat. No. 4,555,478.

These functional couplers are used in a mol amount of 0.05 to 10 times and often 0.1 to 5 times the mol amount of the coupler contributing to color formation as described above.

(Base Precursor)

The photosensitive material of the present invention may contain a nucleating agent or a nucleating agent precursor, for the purpose of promoting the reactions such as the separating reaction of the developing agent block group, the coupling reaction of the developing agent oxidant and the coupler, the separating reaction of the block group from the dye precursor generated by coupling, and the like. Although various types of nucleating agent precursors are known, a precursor of a type which generates (or releases) a base upon heating may be used. For example, a heat decomposing type (decarboxylation type) base precursor which is formed from a salt of a carboxylic acid and a base may be used. Sulfonylacetic acid and propiolic acid which have, as a substituent, a group (an aryl group or an unsaturated heterocyclic ring group) having aromaticity which promotes the decarboxylation, are often used as the carboxylic acid. Base precursors of sulfonylacetic acid salt are disclosed in JP-A No. 59-168441, and base precursors of propiolic acid salt are disclosed in JP-A No. 59-180537. An organic base may often be used as the base side component of the decarboxylation type base precursor, and diacidic bases of amidine derivatives or guanidine derivatives are often used. These are disclosed in JP-B Nos. 7-59545 and 8-10321, and in JP-A No. 11-231457.

The amount (mol) of the base precursor to be used is often 0.1 to 10 times the amount (mol) of the compound of general formula (1) which is used, and 0.3 to 3 times is often used.

The base precursor is often dispersed in a solid particulate form by using a ball mill, a sand grinder mill, or the like.

(Thermal Solvent)

In the present invention, it may be practical to contain a thermal solvent. Here, "thermal solvent" means an organic material which is a solid at ambient temperature, and which, at the heat processing temperature which is used or a temperature lower than that, has a mixing fusing point at which it fuses together with other components, and which becomes liquid at the time of heat development, and which has the effect of promoting the heat development or the heat transfer of the dye. Compounds which can be used as solvents of developing agents, compounds which are substances which have a high dielectric constant and which promote the physical development of the silver salt, compounds which are compatible with the binder and have the effect of making the binder swell, and the like are effective as the thermal solvent.

Examples of thermal solvents which can be used in the present invention are the compounds disclosed in U.S. Pat. Nos. 3,347,675, 3,667,959, 3,438,776, 3,666,477; Research Disclosure No. 17,643; JP-A Nos. 51-19525, 53-24829, 53-60223, 58-118640, 58-198038, 59-229556, 59-68730, 59-84236, 60-191251, 60-232547, 60-14241, 61-52643, 62-78554, 62-42153, 62-44737, 63-53548, 63-161446, 1-224751, 2-863, 2-120739, 2-123354, 4-289856; and the like. Specific examples of compounds which can be often used are urea derivatives (e.g., urea, dimethyl urea, and phenyl urea), amide derivatives (e.g., acetal amide, stearyl amide, P-toluamide, P-propanoyl oxyethoxy benzoamide, and salicylanilide), sulfonamide derivatives (e.g., P-toluenesulfonamide), polyhydric alcohols (e.g., 1,6-hexanediol, pentaerythritol, D sorbitol, and polyethylene glycol).

(Binder)

The heat developable photosensitive material of the present invention uses a binder in the photosensitive layer, the coloring layer, and non-photosensitive layers such as a protective layer, an intermediate layer or the like. The binder can be arbitrarily selected from among well-known natural or synthetic resins such as gelatin, polyvinyl acetal, polyvinyl chloride, polyvinyl acetate, cellulose acetate, polyolefin, polyester, polystyrene, polyacrylonitrile, polycarbonate, SBR latex purified by ultrafiltering (UF), and the like. Of course, copolymers and terpolymers may be used.

The binder of the photosensitive material may be hydrophilic. Examples include the compounds disclosed in the Research Disclosures listed in the previous pages, and the compounds disclosed on pages 71–75 of JP-A No. 64-13546. Specifically, the binder in the present invention is a transparent or semitransparent hydrophilic binder. Examples include natural compounds such as proteins such as gelatin, gelatin derivatives, and the like, and polysaccharides such as cellulose derivatives, starch, gum arabic, dextran, pullulan, and the like, and synthetic macromolecular compounds such as polyvinyl alcohol, denatured polyvinyl alcohol, polyvinyl pyrrolidone, polyacryl amide, and the like. Thereamong, gelatin, and combinations of gelatin and another water-soluble binder, e.g., polyvinyl alcohol, denatured polyvinyl alcohol, polyacryl amide, cellulose derivatives, and the like, are often used. The amount of the binder which is applied is 1 to 25 $g/m^2$, often 3 to 20 $g/m^2$, and more often 5 to 15 $g/m^2$. Thereamong, gelatin is used in a ratio of 50% to 100%, and often 70% to 100%.

(Layer Structure)

The photosensitive material is usually formed from three or more types of photosensitive layers having different color sensitivities. Each photosensitive layer contains at least one silver halide emulsion layer. However, in a representative example, each photosensitive layer is formed from a plurality of silver halide emulsion layers having substantially the same color sensitivities but different degrees of photosensitivity. At this time, it may be practical to use silver halide grains of shapes such that, the greater the projection diameter of the silver halide grains, the greater the aspect ratio which is the grain projected diameter divided by the grain thickness. The photosensitive layer is a unit photosensitive layer having color sensitivity to one of blue light, green light and red light. In a multilayer silver halide color photographic photosensitive material, generally, the arrangement of the unit photosensitive layers is such that the red photosensitive layer, the green photosensitive layer and the blue photosensitive layer are disposed in that order from the support side. However, in accordance with the object, these layers may be arranged in the opposite order, or the arrangement order may be such that different photosensitive layers are sandwiched between layers of the same color photosensitivity. The total film thickness of the photosensitive layers may be generally 2 to 40 $\mu$m and often 5 to 25 $\mu$m.

The plurality of silver halide emulsion layers forming each unit photosensitive layer are often disposed such that two layers which are a high sensitivity emulsion layer and a low sensitivity emulsion layer are arranged such that their degrees of photosensitivity decrease successively toward the substrate, as disclosed in DE 1,121,470 or GB 923,045. Further, as disclosed in JP-A Nos. 57-112751, 62-200350, 62-206541 and 62-206543, the low sensitivity emulsion layer may be disposed at the side further from the support, and the high sensitivity emulsion layer may be disposed at the side closer to the support.

As specific examples, from the side which is the furthest away from the support, the layers may be disposed in the order of low sensitivity blue photosensitive layer (BL)/high sensitivity blue photosensitive layer (BH)/high sensitivity green photosensitive layer (GH)/low sensitivity green photosensitive layer (GL)/high sensitivity red photosensitive layer (RH)/low sensitivity red photosensitive layer (RL), or in the order of BH/BL/GL/GH/RH/RL, or in the order of BH/BL/GH/GL/RL/RH, or the like.

Further, as disclosed in JP-B No. 55-34932 and JP-A Nos. 56-25738 and 62-63936, the layers may be disposed in the order of blue photosensitive layer/GH/RH/GL/RL from the side the furthest away from the support, or may be disposed in the order of blue photosensitive layer/GL/RL/GL/RH from the side the furthest away from the support.

Further, as disclosed in JP-B No. 49-15495, an arrangement is possible which is formed from three layers having different degrees of photosensitivity which successively decrease toward the support, where the silver halide emulsion layer having the highest degree of photosensitivity is disposed as the top layer, a silver halide emulsion layer having a lower degree of photosensitivity is disposed as the intermediate layer, and a silver halide emulsion layer having an even lower degree of photosensitivity than the intermediate layer is disposed as the bottom layer. In such a case of using three layers having different degrees of photosensitivity, as disclosed in JP-A No. 59-202464, in layers of the same color sensitivity, it is possible to dispose the emulsion layers in the order of intermediate sensitivity emulsion layer/high sensitivity emulsion layer/low sensitivity emulsion layer, from the side far away from the support.

In addition, an arrangement in the order of high sensitivity emulsion layer/low sensitivity emulsion layer/intermediate sensitivity emulsion layer, or low sensitivity emulsion layer/ intermediate sensitivity emulsion layer/high sensitivity emulsion layer may be used. Moreover, in a case in which four or more layers are used, the arrangement may be changed as described above.

In order to improve the color reproducibility, it may be practical to dispose adjacent or near to the main photosensitive layer a donor layer (CL) having an interlayer effect and whose spectral sensitivity distribution is different from that of the main photosensitive layer, such as BL, GL, RL, or the like, as disclosed in U.S. Pat. Nos. 4,663,271, 4,705,744, 4,707,436 and JP-A Nos. 62-160448 and 63-89850.

In the present invention, the silver halide and the dye donating coupler and the color developing agent (or precursor thereof) may be contained in the same layer, or may be added separately in different layers provided that they are in a state in which reaction is possible.

The relationships between the spectral sensitivities of the respective layers and the hues of the couplers are arbitrary. However, generally, a cyan coupler is used in the red photosensitive layer, a magenta coupler is used in the green photosensitive layer, and a yellow coupler is used in the blue photosensitive layer.

(Decoloring Dye)

In the present invention, a yellow filter layer, a magenta filter layer, and an antihalation layer can be used as coloring layers using dyes which can decolor in the processing. In this way, when, for example, the photosensitive layers are provided in the order of red photosensitive layer, green photosensitive layer, blue photosensitive layer from the side nearest to the support, a yellow filter layer can be provided between the blue photosensitive layer and the green photosensitive layer, a magenta filter layer can be provided between the green photosensitive layer and the red photosensitive layer, and a cyan filter layer (antihalation layer) can be provided between the red photosensitive layer and the support. These coloring layers may directly contact the emulsion layers, or may be disposed so as to contact the emulsion layer via an intermediate layer of gelatin or the like. The amount of the dye which is used is such that the transmission densities of the respective layers with respect to blue, green and red light respectively are 0.03 to 3.0, and often 0.1 to 1.0. Specifically, an amount of 0.005 to 2.0 $\mu m/m^2$ may be used and 0.05 to 1.0 $\mu m/m^2$ may be practical, although it depends on the E and the molecular weight of the dye.

The dyes in the yellow filter layer and the antihalation layer decoloring or being eliminated at the time of development means that the amount of the dye remaining after processing may be ⅓ or less, and often 1/10 or less, than the amount immediately before coating.

The photosensitive material of the present invention may use a mixture of two or more dyes in one coloring layer. For example, the three types of dyes of yellow, magenta and cyan can be mixed together and used in the aforementioned antihalation layer.

Specifically, dyes such as those disclosed in European Patent Application EP 549,489A and in JP-A Nos. 7-152129 and 8-101487 can be used.

Further, the dye can be mordanted with a mordant and a binder. In this case, the mordant and dyes can be those which are known in the field of photography. Examples of the mordant are those disclosed in columns 58-59 of U.S. Pat. No. 4,500,626, pages 32–41 of JP-A No. 61-88256, and in JP-A Nos. 62-244043 and 62-244036.

Leuco dyes and the like which decolor can be used. Specifically, JP-A No. 1-150132 discloses a silver halide photosensitive material containing a leuco dye which has generated color in advance by a developer which is an organic acid metal salt. Leuco dyes and developer complexes decolor when heated or upon reaction with alkali agents.

Known leuco dyes and developers can be used. Examples thereof are disclosed in Moriga and Yoshida, "Senryo to Yakuhin" ("Dyes and Chemicals"), pages 9 and 84 (Kaseihin Kogyo Kyokai); "Shinpan Senryo Binran" ("New Dye Handbook"), p. 242 (Maruzen, 1970); R. Garner, "Reports on the Progress of Appl. Chem.", 56, page 199 (1971); "Senryo to Yakuhin" ("Dyes and Chemicals"), pages 19 and 230 (Kaseihin Kogyo Kyokai, 1974); "Shikizai" ("Coloring Agents"), pages 62 and 288 (1989); "Senshoku Kogyo" ("Dyeing Industry"), 32, 208; and the like. In addition to acid clay developers and phenol formaldehyde resins, metal salts such as metal salts of salicylic acids, metal salts of phenol-salicylic acid-formaldehyde resins, rhodanate, xanthate, and the like are effective as the developer. The oil soluble zinc salicylate salts disclosed in the specifications of U.S. Pat. Nos. 3,864,146 and 4,046,941 and in JP-B No. 52-1327 may be applicable.

Dyes which are reversibly decolorable can also often be used in the present invention.

This is a method using a reversibly decolorable dye which colors at a temperature of less than a decoloring starting temperature (T), and at temperatures of T or greater, at least a portion of the dye decolors, and this change is reversible. By setting the temperature at the time of reading to be greater than or equal to the decoloring temperature (T° C.), the deterioration of the S/N at the time of reading due to the density of the dye can be prevented. Such a reversible dye can be prepared by combining a higher alcohol and a phenol developer and a leuco dye disclosed in JP-B No. 51-44706.

Further, a dye which decolors at the time of processing in the presence of a decoloring agent can be used. Examples of the dyes which can be used are the cyclic ketomethylene compounds disclosed in JP-A Nos. 11-207027 and 2000-89414, the cyanine dyes disclosed in European Patent No. 911693A1, the polymethylene dyes disclosed in U.S. Pat. No. 5,324,627, and the merocyanine dyes disclosed in JP-A No. 2000-112058. Examples of the decoloring agent are alcohols and phenols, amines and anilines, sulfinic acids and salts thereof, sulfurous acids and salts thereof, thiosulfuric acids and salts thereof, carboxylic acids and salts thereof, hydrazines, guanidines, aminoguanidines, amidines, thiols, cyclic and chain active methylene compounds, cyclic and chain active methine compounds, anions generated from compounds thereof, and the like.

Among these, hydroxyamines, sulfinic acids, sulfurous acids, guanidines, aminoguanidines, heterocyclic thiols, cyclic or chain active methylene compounds, and active methine compounds are often used. The previously-mentioned basic precursors can also often be used.

In this case, the density of the dye after decoloring is ⅓ or less, and often ⅕ or less, of the original density. The mol amount of the decoloring agent which is used is 0.1 to 200 times, and often 0.5 to 100 times the mol amount of the dye.

It may be practical to disperse the decoloring dye into microcrystal grains as described above, and add the mixture into a photosensitive material. Further, the decoloring dye may be used in a state in which oil drops, in which the decoloring dye is dissolved in oil and/or an oil soluble polymer, are added to a hydrophilic binder. A high boiling point oil can, if needed, be used in combination with a low boiling point organic solvent having a boiling point of 50° C. to 160° C., and two or more types of high boiling point oils can be used in combination. Further, an oil soluble polymer can be used in place of or together with an oil. The amount of the high boiling point oil and/or polymer is 0.01 g to 10 g, and often 0.1 g to 5 g, with respect to 1 g of the dye which is used.

(Support, Backing, and Mode of Working)

Structures which are transparent and which can withstand processing temperatures can be used as the support for the photosensitive material in the present invention. Examples include the papers and synthetic high polymers (films) and the like described in "Shashin Kogaku no Kiso-Gin'en Shashin Hen" ("Basics of Photographic Engineering—Silver Salt Photography Edition"), edited by the Nihon Shashin Gakkai (Society of Photographic Science and Technology of Japan), Corona Co., Ltd., (1979), pages 223–240. Specific examples are polyethylene terephthalate, polyethylene naphthalate, polycarbonate, polyvinyl chloride, polystyrene, polypropylene, polyimide, and the like.

Among these, polyesters whose main component is polyethylene naphthalate may be used. Here, "polyesters whose main component is polyethylene naphthalate" are often such that the content of naphthalene carboxylic acid in all of the dicarboxylic acid residual groups is 50 mol % or more, and more often 60 mol % or more, and even sometimes 70 mol % or more. These may be a copolymer or a polymer blend.

In the case of copolymerization, other than naphthalene carboxylic acid units and ethylene glycol units, compounds formed by copolymerizing units such as terephthalic acid, bisphenol A, cyclohexane dimethanol, and the like are also used. Among these, compounds formed by copolymerizing terephthalic acid units may often be practical from the standpoints of dynamic strength and cost.

Examples of suitable compounds to be used together with polymer blends are, from the standpoint of comparability, polyesters such as polyethylene terephthalate (PET), polyarylate (PAR), polycarbonate (PC), polycyclohexane dimethanol terephthalate (PCT), and the like. Among these, polymer blends with PET may often be practical from the standpoints of dynamic strength and cost.

When the demands on heat resistance and the curling property in particular are severe, the supports disclosed in JP-A No. 6-41281 and the like can be often used as the support of the photosensitive material. Supports which are styrene polymers mainly having a syndiotactic structure also can be often used. The thickness of the support is often 5 to 200 $\mu$m, and more often 40 to 120 $\mu$m.

In order to adhere the photosensitive material structuring layers to the support, it may be practical to carry out a surface treatment. Examples include surface activating treatments such as chemical treatment, mechanical treatment, corona discharge treatment, flame treatment, UV light treatment, high frequency treatment, glow discharge treatment, active plasma treatment, laser treatment, mixed acid treatment, ozone-oxidation treatment, and the like. Among the surface treatments, UV light irradiating treatment, flame treatment, corona treatment and glow treatment are often used.

The method of undercoating will be described hereinafter. One layer or two or more layers may be used. Examples of the binder for the undercoat layer include copolymers whose starting materials are monomers selected from vinyl chloride, vinylidene chloride, butadiene, methacrylic acid, acrylic acid, itaconic acid, maleic anhydride and the like. Other examples of the binder include polyethylene imine, epoxy resins, grafted gelatin, nitrocellulose, gelatin, polyvinyl alcohol, and modified polymers thereof. Resorcinol and P-chlorophenol are examples of the compound which swells the support. Examples of gelatin hardening agents used in the undercoat layer are chromium salts (such as chromium alum), aldehydes (e.g., formaldehyde, and glutalaldehyde), isocyanates, active halogen compounds (e.g., 2,4-dicyclo-6-hydroxy-S-triazine), epichlorohydrine resins, active vinylsulfone compounds and the like. $SiO_2$, $TiO_2$, inorganic particulates or polymethyl methacrylate copolymer particulates (0.01 to 10 mm) may be included as a matting agent.

With regard to the dye used in the film dyeing, a clay dye may often be practical from the standpoint of the general color properties of a photosensitive material. Dyes which have excellent heat resistance in the range of film forming temperatures and which have excellent compatibility with polyester may often be used. From this standpoint, these objects can be achieved by mixing together commercially available dyes for polyesters such as DIARESIN manufactured by Mitsubishi Chemical Industries Co., Ltd., KAYASET manufactured by Nihon Kayaku Co. Ltd., and the like. From the standpoint of heat resistance stability in particular, anthraquinone dyes are examples of dyes which can be used. For example, the dyes disclosed in JP-A No. 8-122970 can be often used.

Further, the supports having a magnetic recording layer disclosed in JP-A Nos. 4-124645, 5-40321, 6-35092 and 6-317875 are often used as the support, and information relating to the photographic shooting or the like is often recorded thereon.

The magnetic recording layer is formed by coating on the substrate an aqueous or organic solvent coating liquid in which magnetic particles are dispersed in a binder.

Examples of the magnetic particles which can be used are ferromagnetic iron oxides such as $\gamma$-$Fe_2O_3$ and the like, Co-coated $\gamma$-$Fe_2O_3$, Co-coated magnetite, Co-containing magnetite, ferromagnetic chromium dioxide, ferromagnetic metals, ferromagnetic alloys, hexagonal Ba ferrite, Sr ferrite, Pb ferrite, Ca ferrite, and the like. Co-coated ferromagnetic iron oxides such as Co-coated $\gamma$-$Fe_2O_3$ and the like may often be practical. The magnetic particles may be any of needle-shaped, rice-grain-shaped, spherical, cubic, tabular, or the like. The specific surface area thereof is often 20 $m^2/g$ or more in SBET, and 30 $m^2/g$ or more may often be practical. The saturation magnetization ($\Sigma S$) of the ferromagnetic bodies is often $3.0*10^{-4}$ to $3.0*10^5$ A/M, and particularly often $4.0*10^{-4}$ to $2.5*10^5$ A/M. The ferromagnetic particles may be subjected to a surface treatment by silica and/or alumina or an organic material. Moreover, the surfaces of the ferromagnetic particles may be treated by a silane coupling agent or a titanium coupling agent as disclosed in JP-A No. 6-161032. Further, the ferromagnetic particles, whose surfaces are covered with inorganics or organics and which are disclosed in JP-A Nos. 4-259911 and 5-81652, can be used.

Next, the polyester support is subjected to a heat treatment in which the heat treatment temperature is 40° C. or more but less than TG, and often −20° C. or more and less than TG, in order to make the polyester support difficult to curl. The heat treatment may be carried out at a uniform temperature within this range of temperatures, or may be carried out while cooling. The time over which the heat treatment is carried out is 0.1 hours or more to 1500 hours or less, and more often 0.5 hours or more to 200 hours or less. The heat treatment of the support maybe carried out while the support is in a roll-form, or while the support is being conveyed in a web form. Indentations and projections may be formed on the surface (e.g., conductive inorganic particulates such as $SnO_2$ or $Sb_2O_5$ or the like may be coated) so as to improve the shape of the surface. Moreover, it may be practical to take measures such as preventing transfer of the cut opening of the winding core portion by knurling the end portions so as to make only the end portions slightly higher. These heat treatments may be carried out at any of the stages of after film formation of the support, after the surface treatment, after coating of the backing layer (e.g., an antistatic agent, or a lubricating agent), or after coating of the undercoat. The heat treatment is often carried out after coating of an antistatic agent.

A UV absorbent may be kneaded into the polyester. Further, in order to achieve the object of preventing light piping, a commercially available dye or pigment for polyesters such as DIARESIN manufactured by Mitsubishi Chemical Industries Co., Ltd., KAYASET manufactured by Nihon Kayaku Co., Ltd., or the like, may be kneaded in.

The supports disclosed in detail in Kokai Giho 94-6023 may often be practical as the support for photography used in the present invention.

The heat developing photographic photosensitive material in the present invention has, on at least one side of a support, a photosensitive layer including a silver halide emulsion. On the other side, the photosensitive material may have a backing layer formed from a non-photosensitive layer containing a hydrophilic binder. Specifically, it may be practical to coat a gelatin layer or a binder layer whose main component is a gelatin layer, on the side opposite the side at which the photosensitive layer is provided, as disclosed in JP-A No. 5-333471. Moreover, a layer having a polymer layer may be coated on a gelatin layer as disclosed in JP-A No. 5-232625.

Next, the film cartridge in which the photosensitive material can be loaded will be described.

The main material of the cartridge used in the present invention may be metal or a synthetic plastic.

Further, a cartridge in which a spool is rotated and a film is fed out may be used. Or, a structure may be used in which the distal end of the film is accommodated within the cartridge main body, and by rotating a spool shaft in a direction of feeding out the film, the distal end of the film is fed out to the exterior from a port of the cartridge. Such structures are disclosed in U.S. Pat. Nos. 4,834,306 and 5,226,613.

Preferable plastic materials are polystyrene, polyethylene, polypropylene, polyphenyl ether, and the like. Further, the cartridge of the present invention may contain any of various types of antistatic agents, and carbon black, metal oxide particles, nonionic, anionic, cationic and betaine surfactants or polymers and the like can often be used. Cartridges which are made to have an antistatic property in this way are disclosed in JP-A Nos. 1-312537 and 1-312538. In particular, a resistance at 25° C. and 25% RH of $10^{12}$ Ω or less maybe selected. Plastic cartridges are usually formed by using plastics in which carbon black or a pigment or the like has been kneaded in order to provide the cartridge with a light-blocking ability. The cartridge size may be the current 135 size. Or, with cameras becoming smaller sized, it is effective to make the diameter of a 25 mm cartridge for current 135 size be 22 mm or less. The volume of the case of the cartridge is 30 $cm^3$ or less, and often 25 $cm^3$ or less. The weight of the plastic used for the cartridge or the cartridge case is often 5 g to 15 g.

The photographic film used in the present invention may be accommodated in the same cartridge when it is a raw film and after it has been photographed, or may be accommodated in different cartridges.

The photosensitive material used in the image forming device of the present invention may be a monochromatic photographic photosensitive material or a color photographic photosensitive material. A negative film for an advanced photo system (hereinafter called "AP system") is often used as the color photographic photosensitive material. For example, films in the NEXIA series manufactured by Fuji Photo Film Co., Ltd. (hereinafter called "Fuji Film"), i.e., NEXIA-F, NEXIA-A200, NEXIA-H400, and NEXIA ZOOM MASTER 800 (whose ISOs are respectively 100, 200, 400 and 800), may be processed in AP system format and accommodated in a cartridge to be exclusively used therefor. Such cartridge films for AP systems can be loaded into and used in cameras for AP systems, such as the EPION series cameras manufactured by Fuji Film, or the like.

The QuickSnap Super Slim manufactured by Fuji Film is a representative example of the color photographic photosensitive material used in the present invention. Further, the lens-equipped film units disclosed in JP-B No. 2-32615 and Japanese Utility Model Application Publication (JP-Y) No. 3-39784 may be used.

A lens-equipped film unit is a product in which an unexposed color or monochrome photographic photosensitive material is loaded in advance during the process of manufacturing a unit in which a photographic lens and a shutter are provided within a plastic housing formed by, for example, injection molding.

Because the present invention has the above-described structure, image density of a photosensitive material can be automatically corrected in accordance with the environment, and excellent density reproducibility and stability can be ensured.

What is claimed is:

1. An image forming device subjecting a photographed photosensitive material, in which at least silver halide grains and a developing agent or a precursor of a developing agent are incorporated on a support, to heat-developing processing by conveying the photosensitive material to a heating section, so as to form an image on the photosensitive material, said image forming device comprising:

a device temperature-sensing device for sensing a temperature within the image forming device;

a device humidity-sensing device for sensing a humidity within the image forming device;

a heating device for heating an interior of the heating section;

a conveying device for conveying the photosensitive material within the heating section;

a computing device for computing an optimal value of a heating temperature within the heating section and an optimal value of a heating time, on the basis of the temperature and the humidity sensed by the temperature-sensing device and the humidity-sensing device; and a control device for controlling one of a heating temperature by the heating device and a photosensitive material conveying-speed by the conveying device, such that at least one of said optimal values is attained, wherein the control device controls the heating temperature by the heating device and the photosensitive material conveying-speed by the conveying device.

2. The image forming device of claim 1, wherein the conveying device has a driving motor and conveying rollers.

3. The image forming device of claim 1, wherein the control device is a temperature regulator, and the temperature regulator has a microcomputer in which are incorporated: a ROM storing a correlation function between the heating temperature and the heating time of the heating device, and one of a temperature and a moisture content of the photosensitive material; an I/O port to which the temperature-sensing device and the humidity-sensing device are connected; and a RAM storing results of measurement of the temperature-sensing device and the humidity-sensing device at all times.

4. The image forming device of claim 3, wherein the ROM further stores functions which control a temperature of the heating device by a PD method.

5. The image forming device of claim 3, further comprising a power source connected so as to be able to supply electricity to the temperature regulator, and the temperature regulator can output a signal, and the image forming device further comprises a TRIAC circuit which is connected to the temperature regulator so as to be able to receive the signal, and which is provided between the temperature regulator and the power source, and which can control the heating device.

6. The image forming device of claim 3, further comprising a power source connected so as to be able to supply electricity to the temperature regulator, and the temperature regulator can output a signal, and the image forming device further comprises a solid-state relay which is connected to the temperature regulator so as to be able to receive the signal, and which is provided between the temperature regulator and the power source, and which can control the heating device.

7. The image forming device of claim 4, wherein the functions stored in the ROM are control functions corresponding to a plurality of temperature change patterns of the heating device, and the ROM further stores the plurality of temperature change patterns which correspond to the control functions.

8. The image forming device of claim 4, wherein the microcomputer of the temperature regulator further has incorporated therein a CPU, and, in accordance with the correlation function stored in the ROM, the CPU determines an optimal temperature of the heating device at the temperature and the humidity measured by the temperature-sensing device and the humidity-sensing device.

9. The image forming device of claim 8, wherein the CPU computes a change in temperature of the heating device from the temperature of the heating device measured by the temperature-sensing device, and the CPU judges to which of a plurality of temperature change patterns the computed change in temperature corresponds, and selects one of the control functions.

10. An image forming device subjecting a photographed photosensitive material, in which at least silver halide grains and a developing agent or a precursor of a developing agent are incorporated on a support, to heat-developing processing by conveying the photosensitive material to a heating section, so as to form an image on the photosensitive material, said image forming device comprising:

a photosensitive material loading section in which the photosensitive material is loaded;

a photosensitive material temperature-sensing device for sensing a temperature of the photosensitive material loaded in the photosensitive material loading section;

a moisture content sensing device for sensing a moisture content of the photosensitive material loaded in the photosensitive material loading section;

a heating device for heating an interior of the heating section;

a conveying device for conveying the photosensitive material within the heating section;

a computing device for computing an optimal value of a heating temperature within the heating section and an optimal value of a heating time, on the basis of the temperature and the moisture content sensed by the photosensitive material temperature-sensing device and the moisture content sensing device; and a control device for controlling one of a heating temperature by the heating device and a photosensitive material conveying-speed by the conveying device, such that at least one of said optimal values is attained, wherein the control device controls the heating temperature by the heating device and the photosensitive material conveying-speed by the conveying device.

11. The image forming device of claim 10, wherein the conveying device has a driving motor and conveying rollers.

12. The image forming device of claim 10, wherein the control device is a temperature regulator, and the temperature regulator has a microcomputer in which are incorporated: a ROM storing a correlation function between the heating temperature and the heating time of the heating device, and one of a temperature and a moisture content of the photosensitive material; an 110 port to which the temperature-sensing device and the humidity-sensing device are connected; and a RAM storing results of measurement of the temperature-sensing device and the humidity-sensing device at all times.

13. The image forming device of claim 10, wherein a correlation between the temperature and humidity and the heating time is determined in advance from a relationship between the heating time of the heating device and a change in gradation of the photosensitive material and a relationship between a density of the photosensitive material and the temperature and humidity, and an optimal time corresponding to an actually measured temperature and humidity is computed from the correlation, and a conveying speed of the photosensitive material is computed from the optimal time and a conveying path length of the heating device, and the conveying speed is adjusted by a temperature regulator.

14. The image forming device of claim 10, wherein the moisture content sensing device includes one of a near infrared ray moisture content meter and an electrostatic capacity meter.

15. The image forming device of claim 10, wherein the photosensitive material temperature-sensing device is a temperature sensor provided at the photosensitive material loading section.

16. The image forming device of claim 12, wherein the ROM further stores functions which control a temperature of the heating device by a PD method.

17. The image forming device of claim 16, further comprising a power source connected so as to be able to supply electricity to the temperature regulator, and the temperature regulator can output a signal, and the image forming device further comprises a solid-state relay which is connected to the temperature regulator so as to be able to receive the signal, and which is provided between the temperature regulator and the power source, and which can control the heating device.

18. The image forming device of claim 16, further comprising a power source connected so as to be able to supply electricity to the temperature regulator, and the temperature regulator can output a signal, and the image forming device further comprises a TRIAC circuit which is connected to the temperature regulator so as to be able to receive the signal, and which is provided between the temperature regulator and the power source, and which can control the heating device.

19. An image forming device, which subjects a photosensitive material to a heat-developing process, comprising:

a device temperature-sensing device for sensing a temperature within the image forming device;

a device humidity-sensing device for sensing a humidity within the image forming device;

a heating device for heating an interior of the heating section;

a conveying device for conveying a photosensitive material within the heating section;

a computing device for computing an optimal value of a heating temperature within the heating section and an optimal value of a heating time, on the basis of the temperature and the humidity sensed by the temperature-sensing device and the humidity-sensing device; and a control device for controlling one of a heating temperature by the heating device and a photosensitive material conveying-speed by the conveying device, such that at least one of said optimal values is attained;

wherein the control device controls the heating temperature by the heating device and the photosensitive material conveying-speed by the conveying device.

20. The image forming device of claim 1, wherein the conveying device can operate at a plurality of conveying speeds.

* * * * *